United States Patent
Horstman et al.

[11] Patent Number: 6,159,091
[45] Date of Patent: Dec. 12, 2000

[54] ALTERNATE VENTILATION SYSTEM

[75] Inventors: Raymond H. Horstman, Snohomish; Dennis D. Chung, Gig Harbor; Thomas R. Hasenoehrl, Stanwood; Quy Lam, Mukilteo; Luc Tu Kha, Lynnwood; J. Everett Groat, Snohomish, all of Wash.

[73] Assignee: The Boeing Company, Seattle, Wash.

[21] Appl. No.: 09/437,773

[22] Filed: Nov. 1, 1999

[51] Int. Cl.[7] .................................................. B64D 13/00
[52] U.S. Cl. ............................................ 454/76; 62/259.2
[58] Field of Search ................................ 454/71, 72, 74, 454/76; 244/118.5; 62/259.2; 165/80.2

[56] References Cited

U.S. PATENT DOCUMENTS

| | | |
|---|---|---|
| 2,830,521 | 4/1958 | Fischer et al. . |
| 3,426,984 | 2/1969 | Emmons . |
| 4,351,501 | 9/1982 | Peash et al. . |
| 4,432,514 | 2/1984 | Brandon . |
| 5,253,484 | 10/1993 | Corman et al. ................. 454/76 X |
| 5,474,120 | 12/1995 | Severson et al. ............... 454/76 X |
| 5,545,084 | 8/1996 | Fischer et al. ................... 454/76 |
| 5,695,396 | 12/1997 | Markwart et al. ............... 454/76 |

*Primary Examiner*—Harold Joyce
*Attorney, Agent, or Firm*—Harness Dickey & Pierce P.L.C.

[57] ABSTRACT

An alternate ventilation system for an aircraft having a body structure and a plurality of electronic devices is provided. The ventilation system includes a ventilation conduit, an inboard supply valve, a first outflow valve and a second outflow valve. The ventilation conduit is adapted to be coupled to the body structure for directing a ventilation flow of air along a predetermined flow path. The inboard supply valve is coupled to the ventilation conduit and adapted for drawing air from the cabin into the ventilation conduit when positioned in the open condition. The first outflow valve is coupled to the ventilation conduit and adapted for discharging at least a portion of the ventilation flow from the ventilation conduit to a point outside the body structure when positioned in the open condition. The second outflow valve is coupled to the body structure and operable in a first mode and a second mode. The first mode is adapted to selectively enable a discharge airflow from the cabin and the second mode is adapted to selectively enable an input airflow into the cabin. A method for ventilating an aircraft is also provided herein.

19 Claims, 3 Drawing Sheets

ALTERNATE VENTILATION SYSTEM

TECHNICAL FIELD

The present invention relates generally to aircraft ventilation systems and more particularly to an aircraft ventilation system having a mode of operation wherein an alternate exhaust valve is employed to provide a flow of ventilating air to ventilate the aircraft.

BACKGROUND OF THE INVENTION

BACKGROUND ART

In cabin pressurizing and ventilating systems, an air pressure source such as an air pump, supercharger, or the like is typically provided to supply pressurized air to the cabin. Air pressure within the cabin is maintained at the required pressure by controlling the flow of air from the cabin through one or more outflow valves disposed in an opening or openings in the body structure forming the aircraft. The air provided by the air pressure source is also conventionally used to cool various electronic devices that are used to control and navigate the aircraft.

Failures interrupting the supply of pressurized air from these air pressure sources are possible but have been predicted to have an extremely low probability of occurrence. However, in the event of such a failure, it would be possible for cabin temperatures, humidity the concentration of undesired gasses such as carbon dioxide, to reach undesired levels. Consequently, it is highly desirable to provide an alternate air conditioning device for ventilating the cabin and cooling the electronic control and navigation devices in the event of a failure of the system that provides pressurized air to the cabin and electrical control and navigation devices.

Several alternate air conditioning systems are known in the art and these generally include a deployable ram-air scoop. Upon the occurrence of a failure, the ram-air scoop of these systems is projected into the airstream to direct or "scoop" a flow of fresh air directly into the aircraft's air distribution system to ventilate the cabin and cool desired electronic components. While such devices are effective, they nonetheless have several drawbacks.

One notable drawback concerns the relative cost of these ram-air scoops, especially in view of the fact that such failures in the air distribution system would be extremely rare. By their nature, the ram-air scoop systems are dedicated to a single function. Consequently, aircrafts that employ such devices incur a cost and an increase in the weight of the aircraft to which very little offsetting benefit is gained as a result of the low probability of a failure which would require the use of the ram-air scoop to provide ventilation to the aircraft. Additionally, integrating such systems into existing aircraft can be difficult and very costly due to the amount of labor involved.

In view of these drawbacks, there remains a need in the art for a cost-efficient alternative ventilation system that may be employed when a failure interrupts the supply of pressurized air that is used to ventilate an aircraft cabin and cool the aircraft control and navigation electronics.

It is therefore one object of the present invention to provide an alternate ventilation system to ventilate the cabin of an aircraft and cool the aircraft's electrical devices.

It is another object of the present invention to provide an alternate ventilation system which is cost efficient and easily integrated into an aircraft.

It is another object of the present invention to provide a method for ventilating an aircraft.

SUMMARY OF THE INVENTION

An alternate ventilation system for an aircraft having a body structure and a plurality of electronic devices is provided. The ventilation system includes a ventilation conduit, an inboard supply valve, a first outflow valve and a second outflow valve. The ventilation conduit is adapted to be coupled to the body structure for directing a ventilation flow of air along a predetermined flow path. The inboard supply valve is coupled to the ventilation adapted for drawing air from the cabin into the ventilation conduit when positioned in the open condition. The first outflow valve is coupled to the ventilation conduit and adapted for discharging at least a portion of the ventilation flow from the ventilation conduit to a point outside the body structure when positioned in the open condition. The second outflow valve is coupled to the body structure and operable in a first mode and a second mode. The first mode is adapted to selectively enable a discharge airflow from the cabin and the second mode is adapted to selectively enable an input airflow into the cabin. A method for ventilating an aircraft is also provided herein.

Additional advantages and features of the present invention will become apparent from the subsequent description and the appended claims, taken in conjunction with the accompanying drawings.

DETAILED DESCRIPTION OF THE PREFERRED EMBODIMENTS

Figure 1:
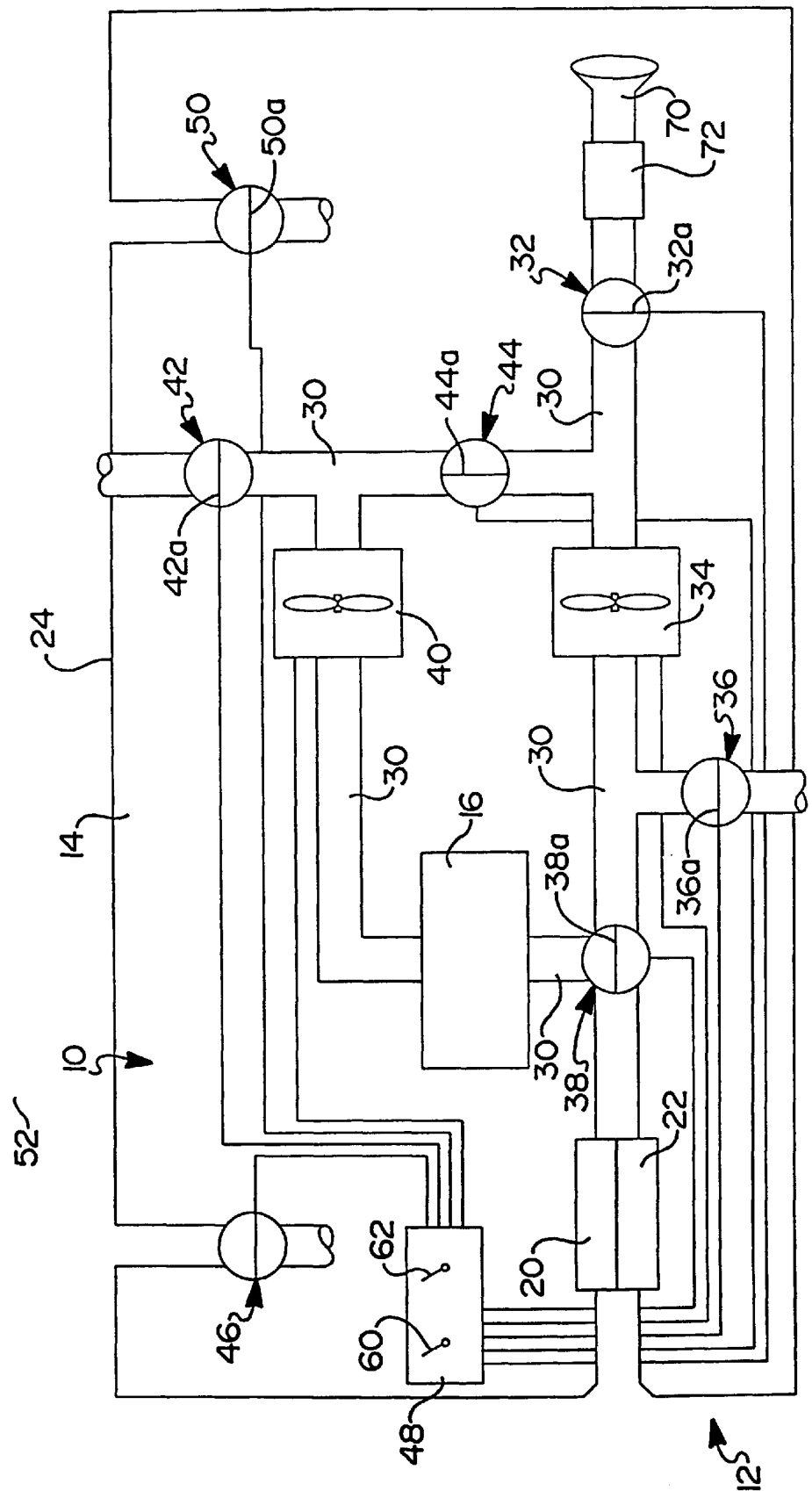
FIG. 1 is a schematic diagram of an aircraft constructed in accordance with the teachings of the present invention.

With reference to FIG. 1 of the drawings, a ventilation system constructed according to the teachings of a preferred embodiment of the present invention is generally indicated by reference numeral 10. Ventilation system 10 is operable for circulating air through an aircraft 12 to ventilate the aircraft cabin 14 and cool a plurality of electrical components 16 which are employed for the operation of aircraft 12.

As schematically illustrated, aircraft 12 also includes first and second superchargers 20 and 22, respectively, and a rigid body structure 24 to which ventilation system 10 is fixedly coupled. First and second superchargers 20 and 22 are conventional in their construction and operation and supply ventilation system 10 with supercharged air which is employed to ventilate cabin 14.

Ventilation system 10 is shown to conventionally include a ventilation conduit 30, an inboard supply valve 32, a supply fan 34, an override valve 36, a manifold interconnect valve 38, an exhaust fan 40, an overboard exhaust valve 42, a bypass valve 44 and at least one negative pressure relief valve 46. Ventilation system 10 is also shown to include a controller 48 and a forward alternate exhaust valve 50. Controller 48 is operable for controlling the operation of ventilation system 10. Ventilation conduit 30 is coupled to body structure 24 and operable for directing a flow of air through ventilation system 10 in a predetermined manner. Supply fan 34 and exhaust fan 40 are conventional in their construction and operation and need not be discussed in detail.

Inboard supply valve 32 is coupled to ventilation conduit 30 and includes a valve element 32a. Valve element 32a is movable between a closed condition, which inhibits air from flowing through inboard supply valve 32, and an open condition. Placement of valve element 32a into the open condition enables air to flow from cabin 14 through inboard supply valve 32 and into ventilation conduit 30. Inboard supply valve 32 is otherwise conventional in construction and need not be discussed in further detail.

Override valve 36 and overboard exhaust valve 42 are each coupled to ventilation conduit 30 and include valve elements 36a and 42a, respectively. Valve elements 36a and 42a are each movable between a closed condition, which inhibits air from flowing through override valve 36 and overboard exhaust valve 42, respectively, and an open condition. Placement of either valve element 36a or 42a into the open condition enables air to flow from ventilation conduit 30 to the atmosphere 52. Override valve 36 and overboard exhaust valve 42 are otherwise conventional in construction and need not be discussed in further detail.

Bypass valve 44 is coupled to ventilation conduit 30 and includes a valve element 44a which is movable between a closed condition, which inhibits air from flowing through bypass valve 44, and an open condition. Placement of bypass valve 44 in the open condition permits air to be circulated through ventilation system 10 in a desired manner.

Manifold interconnect valve 38 is coupled to first and second superchargers 20 and 22 and to ventilation conduit 30. Manifold interconnect valve 38 includes a valve element 38a which is movable between a closed condition for preventing pressurized air from first and second superchargers 20 and 22 from entering ventilation conduit 30, and an open condition for directing pressurized air from first and second superchargers 20 and 22 into ventilation conduit 30. Manifold interconnect valve 38 is otherwise conventional in construction and need not be discussed in further detail.

Forward alternate exhaust valve 50 is coupled to body structure 24 and includes a valve element 50a which is movable between a closed condition for inhibiting a flow of air between cabin 14 and atmosphere 52, and an open condition for enabling a flow of air between cabin 14 and atmosphere 52. Forward alternate exhaust valve 50 is operable in a first mode wherein valve element 50a is controlled to exhaust air from aircraft 12. Forward alternate exhaust valve 50 is also operable in a second mode wherein valve element 50a is controlled to intake ambient air into cabin 14.

Negative pressure relief valve 46 is conventional and as such, a detailed description of its construction and operation need not be provided herein. Briefly, negative pressure relief valve 46 is coupled to body structure 24 and operable between a closed position, which inhibits a flow of air from a point outside body structure 24 into cabin 14, and an open position, which enables a flow of air into cabin 14. In the operation of aircraft 12, negative pressure relief valve 46 is normally maintained in its closed position and cabin 14 is maintained at an elevated pressure level relative to the atmospheric condition immediately outside body structure 24. In the event that the pressure in cabin 14 drops below that of the atmospheric condition immediately outside body structure 24, negative pressure relief valve 46 opens to permit a relief flow of air into cabin 14 to thereby raise the pressure of the air in the cabin to that of the atmospheric condition immediately outside body structure 24.

In the particular embodiment illustrated, controller 48 is operable for controlling ventilation system 10 in four different modes: an automatic mode, a standby mode, an override mode and an alternate ventilation mode. In the particular embodiment illustrated, controller 48 includes a first switch 60 for toggling between the automatic, standby and override modes. Controller 48 is operable in each of these modes for configuring the valves and actuating the fans according to a predetermined schedule when the mode is selected. In operating aircraft 12, first switch 60 is normally positioned to cause controller 48 to operate in the automatic mode. Controller 48 also includes a second switch 62 which permits the pilot to manually toggle between the automatic and alternate ventilation modes.

Figure 3:
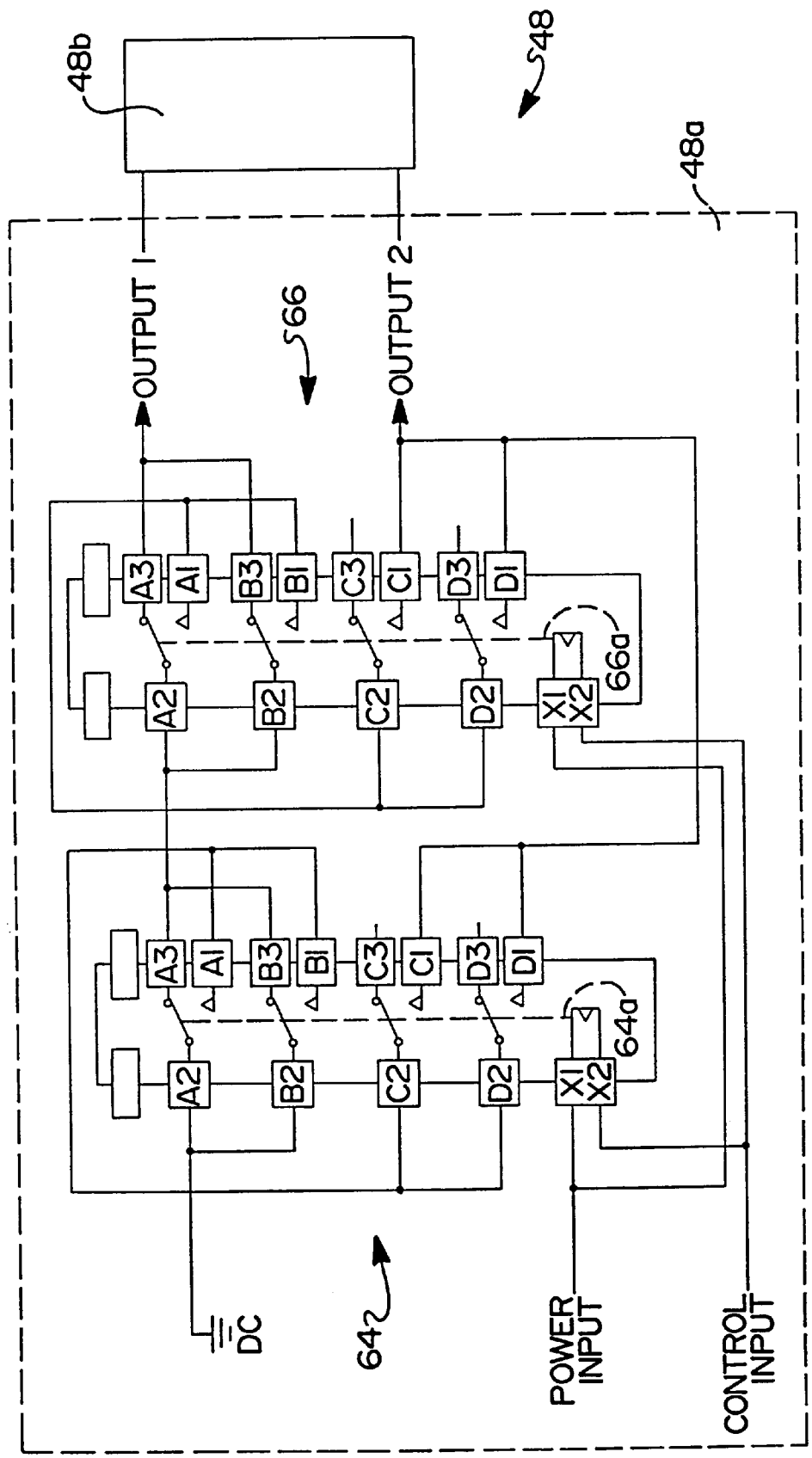
FIG. 3 is a schematic diagram of a portion of the controller for the alternate ventilation system of FIG. 1.

In FIG. 3, a first portion 48a of controller 48 is schematically illustrated to include a first relay 64 and a second relay 66. Toggling second switch 62 into the position to actuate the automatic mode causes the armature 64a of the first relay 64 to move in what is illustrated as an upward direction, causing electrical connection between contacts A2 and A3, B2 and B3, C2 and C3 and D2 and D3, respectively, in first relay 64. Toggling second switch 62 into the position to actuate the automatic mode also causes the armature 66a of the second relay 66 to move in what is illustrated as an upward direction, causing electrical connection between contacts A2 and A3, B2 and B3, C2 and C3 and D2 and D3, respectively, in second relay 66. Configuration of first and second relays 64 and 66 in this manner causes contacts A2 and B2 of the first relay 64 to energize contacts A3 and B3 of the first relay 64. In turn, contacts A3 and B3 of the first relay 64 energize contacts A2 and B2 of the second relay 66. Energization of contacts A2 and B2 of the second relay 66 cause the energization of contacts A3 and B3 in the second relay 66, providing a first output to a second portion 48b of controller 48 which is used to configure the ventilation system for automatic operation.

Toggling second switch 62 into the position to actuate the alternate ventilation mode causes the armature 64a of the first relay 64 to move in what is illustrated as a downward direction, causing electrical connection between contacts A2 and A1, B2 and B1, C2 and C1 and D2 and D1, respectively, in first relay 64. Toggling second switch 62 into the position to actuate the automatic mode also causes the armature 66a of the second relay 66 to move in what is illustrated as a downward direction, causing electrical connection between contacts A2 and A1, B2 and B1, C2 and C1 and D2 and D1, respectively, in second relay 66. Configuration of first and second relays 64 and 66 in this manner causes contacts A2 and B2 of the first relay 64 to energize contacts A1 and B1 of the first relay 64. In turn, contacts A1 and B1 of the first relay 64 energize contacts C2 and D2 of the first relay 64. Energization of contacts C2 and D2 of the first relay 64 cause energization of contacts C1 and D1 of the first relay 64. Energization of contacts C1 and D1 of the first relay 64 provides a second output to the second portion 48b of controller 48 which is used to configure the ventilation system to operate in the alternate ventilation mode.

The use of a dual set of contacts in each of the first and second relays 64 and 66 provides a high degree of reliability to guard against a failure in either relay. Additionally, first and second relays 64 and 66 cooperate to provide an increased level of reliability to ensure that the alternate ventilation mode can be enabled when necessary. In the event of a failure in the first relay 64 where, for example, armature 64a is stuck in an upward position such that first relay is not able to generate the second output to controller 48, contacts A2 and B2 in the first relay 64 would remain energized and as such, contacts A2 and B2 in the second relay 66 would remain energized as discussed above.

However, as armature 66a would be positioned in a downward position, energizing contacts A1 and B1 in the second relay 66. Energization of contacts A1 and B1 in the second relay causes energization of contacts C2 and D2 in the second relay 66, which in turn causes energization of contacts C1 and D1 in the second relay 66 and the generation of the second output signal.

As illustrated in FIG. 1, when aircraft 12 is in flight and operating normally, forward rack supply fan 34 is maintained in an off condition, forward rack exhaust fan 40 is maintained in an on condition, inboard supply valve 32, overboard exhaust valve 42, override valve 36 and manifold interconnect valve 38 are each maintained in a closed condition and bypass valve 44 is maintained in an open condition. Accordingly, this configuration permits a flow of supercharged air to flow through ventilation system 10 where ventilation conduit 30 directs at least a portion of the airflow in a predetermined manner to remove heat from the plurality of electrical components 16.

If a failure occurs where pressurized air from the first and second superchargers 20 and 22 cannot be supplied to ventilation system 10, it would become necessary to ventilate cabin 14 and cool the plurality of electronic components 16 through an alternate air conditioning source, such as that of the present invention.

Prior to activating the alternate ventilation mode, however, it is necessary for controller 48 to determine whether the aircraft 12 is being operated within certain predetermined boundary conditions. This step ensures that the drawing of ambient air into the cabin 14 will not cause additional failures or injure the aircraft passengers. Accordingly, these boundary conditions pertain to the current operating condition of aircraft 12, as well as the condition of the ambient air outside aircraft 12.

The boundary conditions which pertain to the current operating condition of aircraft 12 include the speed and altitude of the aircraft. Operation of aircraft 12 at excessive speeds or altitudes may unnecessarily risk the damaging of aircraft 12 or injury of passengers. Accordingly, controller 48 is operable for inhibiting the operation of the alternate ventilation mode should the aircraft speed exceed a predetermined aircraft speed threshold. Preferably, the predetermined aircraft speed threshold is about 290 knots (air speed). Similarly, controller 48 is also operable for inhibiting the operation of the alternate ventilation mode should the aircraft 12 altitude exceed a predetermined altitude threshold. Preferably, the predetermined altitude threshold is about 10,000 feet above sea level.

The boundary conditions which pertain to the condition of the ambient air outside aircraft 12 include the temperature and relative humidity of the ambient air. The intake of cold air into the cabin 14 may provide an unpleasantly cold environment for the aircraft passengers. However, where passengers will be exposed to extremely cold air, or even to mildly cold air for an extended period of time, operation of ventilation system 10 in the alternate mode may unnecessarily risk the injury of the passengers. Accordingly, controller 48 is operable for inhibiting the operation of the alternate ventilation mode should the temperature of the ambient air outside aircraft 12 be lower than a predetermined temperature threshold. Preferably, the predetermined temperature threshold is about 51° F. (10.56° Celsius).

Similarly, if the relative humidity of the ambient air is sufficiently high, the drawing of ambient air into the cabin 14 may cause water vapor to accumulate in an undesirable manner and adversely effect critical aircraft components, such as the plurality of electrical components 16. Accordingly, controller 48 is also operable for inhibiting the operation of the alternate ventilation mode should the relative humidity of the ambient air outside aircraft 12 be higher than a predetermined relative humidity threshold. Preferably, the predetermined relative humidity threshold is about 43%.

Another boundary condition relates to the detection of fire within aircraft 12, particularly a fire in the plurality of electrical components 16 or in the portion of ventilation system 10 which directs cooling air to the plurality of electrical components 16. If controller 48 determines that an undesirable source of combustion has been detected within cabin 14, controller 48 will inhibit the operation of the alternate ventilation mode so as to inhibit the supply of oxygen to the source of combustion.

Figure 2:
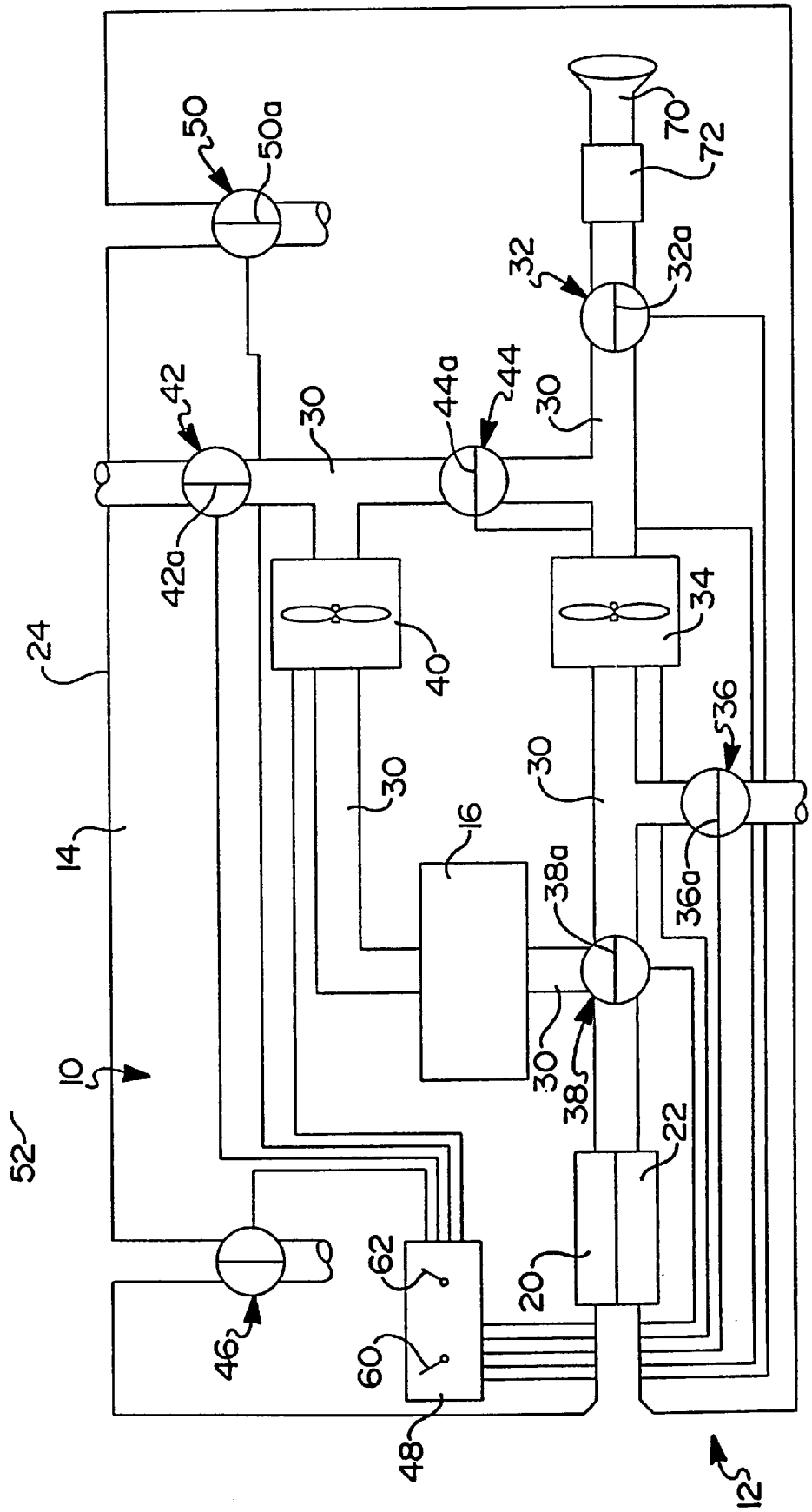
FIG. 2 is a schematic diagram similar to that of FIG. 1 but showing the configuration of the ventilation system when operated in an alternate ventilation mode.

If controller 48 determines that none of the boundary conditions has been exceeded (e.g., aircraft speed and altitude do not exceed the predetermined speed and altitude thresholds, respectively, ambient air temperature and relative humidity do not exceed the predetermined temperature and relative humidity thresholds, and a source of combustion has not been detected within the cabin 14), controller 48 is operable for configuring the fans and valves in a predetermined manner, as shown in FIG. 2, to enable the alternate ventilation mode. In FIG. 2, the supply and exhaust fans 34 and 40 are enabled, the inboard supply valve 32 is opened, the overboard exhaust valve 42 is opened, the bypass valve 44 is closed and the forward alternate exhaust valve 50 is opened.

The configuration of the valves and fans in this manner permits an input flow of atmospheric air to enter cabin 14 through forward alternate exhaust valve 50. The input flow of air is circulated through the cabin 14 and drawn through an intake chute 70. Thereafter, the input flow travels through a filter 72, through inboard supply valve 32 and into ventilation conduit 30. The input flow of air is directed through at least a portion of the plurality of electrical components 16 to remove undesired heat. The heated air is then directed through overboard exhaust valve 42 to the atmosphere 52 outside cabin 14. Since the overboard exhaust valve 42 is typically able to discharge air from cabin 14 at a rate faster than air can be supplied to cabin 14 through forward alternate exhaust valve 50, negative pressure relief valve 46 is employed in a conventional manner to provide a flow of air which supplements the input flow.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments failing within the description of the appended claims.

What is claimed is:

1. In an aircraft having a body structure and a plurality of electronic devices, the body structure defining a cabin, a ventilation system for the aircraft comprising:

a ventilation conduit adapted to be coupled to the body structure for directing a ventilation flow of air along a predetermined flow path;

an inboard supply valve coupled to the ventilation conduit and movable between a closed condition and an open condition, the inboard valve adapted for drawing air from the cabin into the ventilation conduit when positioned in the open condition;

a first outflow valve coupled to the ventilation conduit and movable between a closed condition and an open condition, the first outflow valve adapted for discharging at least a portion of the ventilation flow from the ventilation conduit to a point outside the body structure when the first outflow valve is positioned in the open condition; and a second outflow valve coupled to the body structure, the second outflow valve operable in a first mode and a second mode, the first mode adapted to selectively enable a discharge air flow from the cabin, the second mode adapted to selectively enable an input air flow into the cabin.

2. The ventilation system of claim 1, further comprising at least one negative pressure relief valve adapted to be coupled to the body structure and movable between a closed condition and an open condition, the at least one negative pressure relief valve adapted for drawing air into the cabin from a second point outside the body structure to supplement the input air flow.

3. The ventilation system of claim 1, wherein a first portion of the ventilation conduit is adapted to direct at least a portion of the input air flow to cool the plurality of electronic devices.

4. The ventilation system of claim 1, further comprising a controller having a first relay and a second relay, the first and second relays cooperatively adapted to produce a first control output for inhibiting operation of the second outflow valve in the second mode, and each of the first and second relays adapted for producing a second control output for permitting operation of the second outflow valve in the second mode.

5. In an aircraft having a ventilation system and a body structure and a plurality of electrical devices, the body structure defining a cabin, a method for ventilating the aircraft comprising the steps of:

using a ventilation conduit associated with the body structure for directing a ventilation flow of air along a predetermined flow path;

using an inboard supply valve associated with the ventilation conduit for enabling an intake air flow to be drawn from the cabin into the ventilation conduit, the inboard supply valve selectively positionable between an open condition and a closed condition, the closed condition inhibiting the entry of the intake air flow into the ventilation conduit;

using a first outflow valve associated with the ventilation conduit and selectively positionable between an open condition and a closed condition for discharging at least a portion of the ventilation flow from the ventilation conduit to a point outside the body structure when positioned in the open condition;

using a second outflow valve associated with the body structure and operable in first and second modes for selectively enabling a discharge air flow from the cabin when in the first mode and for selectively enabling an input air flow into the cabin when in the second mode;

determining if the aircraft is operating within a predetermined set of boundary conditions; and if the aircraft is operating within the predetermined set of boundary conditions, enabling an alternate ventilation mode wherein the inboard supply valve is positioned in the open condition, the first outflow valve is positioned in the open position and the second outflow valve is operated in the second mode to permit entry of the input air flow into the cabin.

6. The method for ventilating an aircraft of claim 5, wherein the step of determining if the aircraft is operating within a set of predetermined boundary conditions includes the steps of:

computing a velocity of the aircraft; and determining if the velocity of the aircraft does not exceed a predetermined air speed.

7. The method for ventilating an aircraft of claim 6, wherein the predetermined air speed is about 290 knots.

8. The method for ventilating an aircraft of claim 5, wherein the step of determining if the aircraft is operating within a set of predetermined boundary conditions includes the steps of:

computing an altitude of the aircraft; and determining if the altitude of the aircraft does not exceed a predetermined altitude.

9. The method for ventilating an aircraft of claim 8, wherein the predetermined altitude is about 10,000 feet.

10. The method for ventilating an aircraft of claim 5, wherein the step of determining if the aircraft is operating within a set of predetermined boundary conditions includes the step of determining whether a source of combustion has not been detected within the aircraft.

11. The method for ventilating an aircraft of claim 5, wherein the step of determining if the aircraft is operating within a set of predetermined boundary conditions includes the steps of:

determining an ambient air temperature; and determining if the ambient air temperature exceeds a predetermined ambient air temperature threshold.

12. The method for ventilating an aircraft of claim 11, wherein the predetermined ambient air temperature threshold is about 51° F.

13. The method for ventilating an aircraft of claim 5, wherein the step of determining if the aircraft is operating within a set of predetermined boundary conditions includes the steps of:

determining an ambient air relative humidity; and determining if the ambient air relative humidity exceeds a predetermined ambient air relative humidity threshold.

14. The method for ventilating an aircraft of claim 13, wherein the predetermined ambient air relative humidity threshold is about 43%.

15. The method for ventilating an aircraft of claim 5, wherein the step of enabling an alternate ventilation mode includes the step of directing at least a portion of the input air flow through a first portion of the ventilation conduit to cool the plurality of electronic devices.

16. An aircraft comprising:

a body structure defining a cabin;

a plurality of electronic devices coupled to the body structure; and a ventilation system for ventilating the aircraft, the ventilation system including a ventilation conduit, an inboard supply valve, a first outflow valve and a second outflow valve, the ventilation conduit coupled to the body structure for directing a ventilation flow of air along a predetermined flow path, the inboard supply valve coupled to the ventilation conduit and movable between a closed condition and an open condition, the inboard valve adapted for drawing air from the cabin into the ventilation conduit when positioned in the open condition, the first outflow valve coupled to the ventilation conduit and movable between a closed condition and an open condition, the first outflow valve discharging at least a portion of the ventilation flow from the ventilation conduit to a point outside the body structure when the first outflow valve is positioned in the open condition, the second outflow valve being coupled to the body structure, the second outflow valve operable in a first mode and a second mode, the first mode selectively enabling a discharge air flow from the cabin, the second mode selectively enabling an input air flow into the cabin.

17. The aircraft of claim 16, further comprising at least one negative pressure relief valve coupled to the body structure and movable between a closed condition and an open condition, the at least one negative pressure relief valve operable for drawing air into the cabin from a second point outside the body structure to supplement the input air flow.

18. The aircraft of claim 16, wherein a first portion of the ventilation conduit is operable for directing at least a portion of the input air flow to cool the plurality of electronic devices.

19. The ventilation system of claim 16, further comprising a controller having a first relay and a second relay, the first and second relays cooperatively adapted to produce a first control output for inhibiting operation of the second outflow valve in the second mode, and each of the first and second relays adapted for producing a second control output for permitting operation of the second outflow valve in the second mode.

* * * * *